(12) United States Patent
Takada et al.

(10) Patent No.: US 7,751,693 B2
(45) Date of Patent: Jul. 6, 2010

(54) METHOD AND APPARATUS FOR RECORDING/REPRODUCING IMAGE INFORMATION ON/FROM REMOVABLE MEDIUM

(75) Inventors: Tomomi Takada, Kodaira (JP); Hirotada Ueda, Kokubunji (JP); Seiichi Hirai, Koshigaya (JP); Masahiro Kageyama, Hachioji (JP); Hisao Tanabe, Hachioji (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 247 days.

(21) Appl. No.: 11/240,457

(22) Filed: Oct. 3, 2005

(65) Prior Publication Data
US 2006/0029370 A1    Feb. 9, 2006

Related U.S. Application Data

(62) Division of application No. 09/666,609, filed on Sep. 20, 2000, now abandoned.

(30) Foreign Application Priority Data
Sep. 21, 1999    (JP)    ............................ 11-267689

(51) Int. Cl.
H04N 5/00    (2006.01)
(52) U.S. Cl. ..................... 386/125; 386/45; 386/46; 386/124; 386/126
(58) Field of Classification Search .............. 386/68, 386/70, 95, 96, 124–126
See application file for complete search history.

(56) References Cited

U.S. PATENT DOCUMENTS

| | | | | |
|---|---|---|---|---|
| 5,233,584 A | | 8/1993 | Kulakowski et al. | 369/44.27 |
| 5,442,614 A | * | 8/1995 | Tamegai | 369/53.17 |
| 5,528,571 A | | 6/1996 | Funahashi et al. | |
| 5,590,112 A | | 12/1996 | Morishima | |
| 5,856,964 A | | 1/1999 | Shtipelman et al. | 369/53.36 |
| 5,920,539 A | | 7/1999 | Schell et al. | |
| 6,005,613 A | * | 12/1999 | Endsley et al. | 348/231.6 |
| 6,134,382 A | * | 10/2000 | Mishima et al. | 386/68 |
| 6,298,033 B1 | * | 10/2001 | Tanoue et al. | 369/275.3 |
| 6,356,521 B1 | | 3/2002 | Kimura et al. | |
| 6,366,980 B1 | | 4/2002 | Haines et al. | 711/112 |
| 6,747,942 B1 | * | 6/2004 | Tanoue et al. | 369/275.3 |

FOREIGN PATENT DOCUMENTS

| | | |
|---|---|---|
| EP | 0273384 | 7/1988 |
| JP | 11144381 | 5/1999 |
| JP | 11150728 | 6/1999 |
| JP | 11232791 | 8/1999 |

* cited by examiner

Primary Examiner—Jamie J Atala
(74) Attorney, Agent, or Firm—Brundidge & Stanger, P.C.

(57) ABSTRACT

In an image recording/reproduction method for recording image information on a recording medium by using a computer, a verify mode is set into the OFF state when recording image information on said recording medium. In addition, use as a write or read region a specified region of the recording medium which is greater than or equal to a unitary data size being handled during error correction processing to be performed when writing or reading image information on or out of said recording medium. Additionally, upon reading of image information from the recording medium, any image information that has experienced read errors will never be read again.

2 Claims, 12 Drawing Sheets

METHOD AND APPARATUS FOR RECORDING/REPRODUCING IMAGE INFORMATION ON/FROM REMOVABLE MEDIUM

The present application is a divisional of application Ser. No. 09/666,609, filed Sep. 20, 2000 now abandoned, the contents of which are incorporated herein by reference.

BACKGROUND OF THE INVENTION

The present invention relates generally to image recording/reproducing method and apparatus for use in writing and reading image information into and from data storage medium, and more particularly to image recording/reproducing method and apparatus capable of writing and reading picture image information at a high speed.

Currently available image recording/reproducing apparatus employing a control apparatus such as a computer having a central processor unit (CPU) to record image information is typically designed to include fixed or "hard" disks as recording media for use in recording/reproduction.

The hard disks are high in access speed and large in data storage capacity and thus suitably adaptable for image information editing applications.

However, such hard disks are relatively high in per-bit recording cost while associating difficulties in exchanging recording media, which makes them inappropriate for use in delivery and long-term storage of image information.

In view of this, in recording systems designed to offer increased image information delivery and long-term data storage capabilities, a need is felt to achieve a technique for recording images on a real-time basis by use of readily removable recording media (referred to as "removable media" hereinafter) low in cost and yet high in exchangeability, including but not limited to digital versatile disk random access memory (DVD-RAM) devices.

Existing removable media, in particular DVD-RAMs, are encountered with difficulties in recording image information at required rates higher than or equal to a prespecified recording speed (e.g., writing image information of 30 kB per frame at a rate of 30 frames per second) while at the same time offering increased recording stability without accompanying any risks of picture frame drop-out defects (i.e. lacking of one frame image or more) in the case where image information is recorded by using a specified write processing scheme that employs standard file access functions as inherently built in an operating system ("OS").

SUMMARY OF THE INVENTION

With the above-noted prior art, in removable media typically including DVD-RAMs, in the case the write processing using the OS-standardized file access functions is employed, it has been very difficult to record data at high speeds greater than or equal to a specified value with increased stability without suffering from any possible picture frame dropout risks.

It is therefore an object of the present invention to provide an improved image recording/reproducing method and apparatus capable of recording and reproducing picture images on and from a recording medium at increased speeds.

To attain the foregoing object, in accordance with one aspect of this invention, an image recording/reproducing method and apparatus is provided which is specifically arranged to prevent execution of an error correction processing when recording image information on a recording medium while permitting execution of such an error correction processing during reproduction of image information from the recording medium.

In accordance with an example of the invention, any region of its size less than the unitary data size being handled during error correction procedure is kept out of the use in view of the fact that an attempt to write or read data less in size than the unit data as handled during the error correction would result in a decrease in recording/reproducing speed.

In accordance with another aspect of the invention, an image recording/reproducing method and apparatus are achieved which are capable of offering high-speed recordabilities in a way such that 1) a specific region for use in writing image information is reserved in advance on a recording medium to thereby avoid the necessity of modifying or updating management information of such recording medium during writing of image information, or 2) even upon occurrence of an error during reading, correction processing of such error is later performed separately or the error information is not re-read during reproduction.

According to an example of the invention, the error correction processing during reading is achievable either by replacing read-error information with read information preceding thereto or by permitting the read-error image information containing noises to be displayed as it is without after-treatment, thus attaining the intended high-speed recordabilities.

DETAILED DESCRIPTION OF THE EMBODIMENTS

An image recording/reproducing method and apparatus in accordance with one embodiment of the present invention will be explained with reference to FIG. 4 etc. below.

Figure 4:
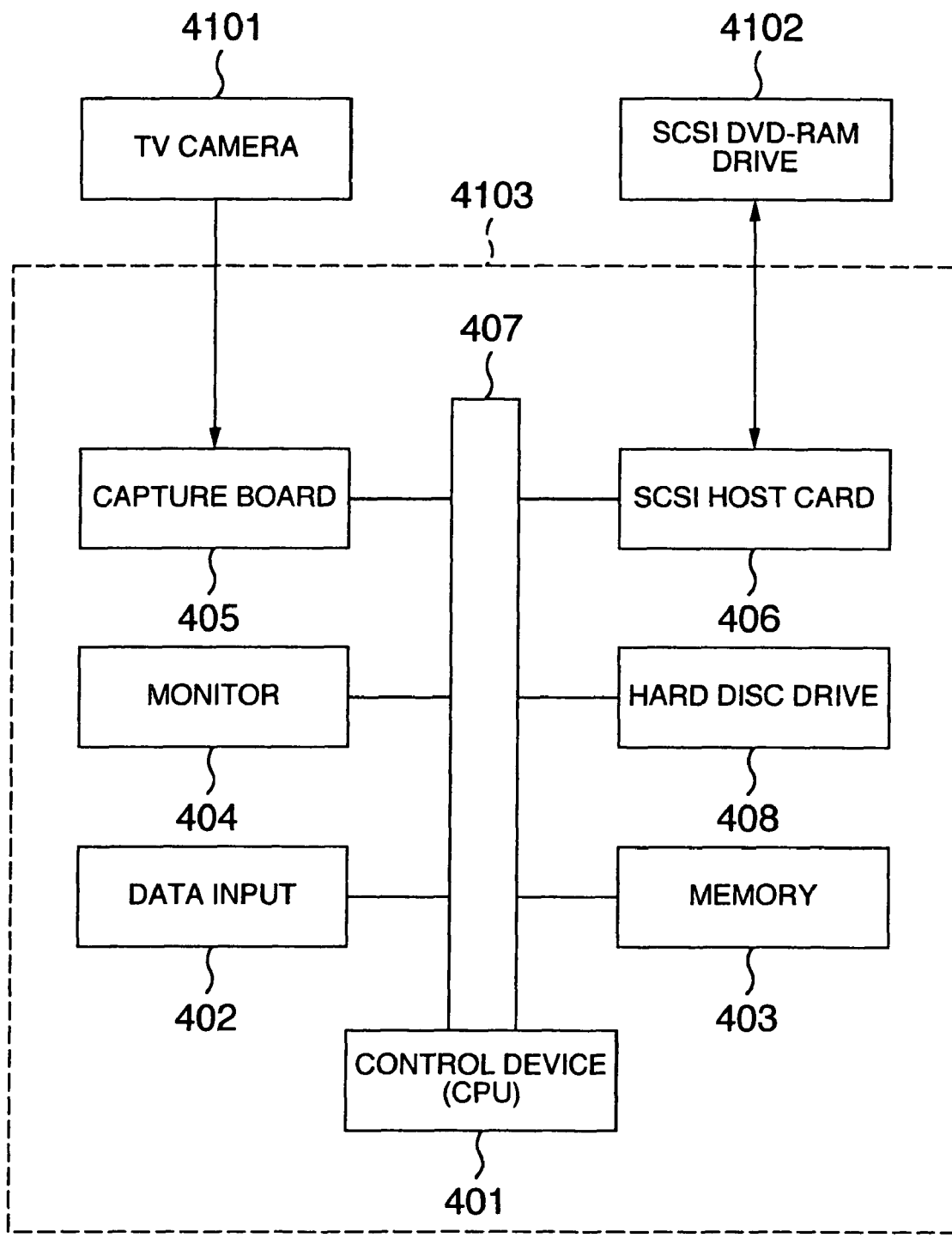
FIG. 4 is a block diagram showing a configuration of the image recording/reproducing apparatus of the invention for performing recording and reproduction of image information according to the embodiment of the invention.

An image recording/reproducing method also embodying the invention is for use with a hardware configuration shown in FIG. 4, by way of an example.

FIG. 4 is a block diagram showing one exemplary configuration in the embodiment of the image recording/reproducing apparatus for performing recording and reproduction of picture image information. The illustrative embodiment is arranged to employ as its image recording medium a removable data storage medium such as a DVD-RAM.

In FIG. 4, reference numeral "4101" designates a television camera (referred to hereinafter as TV camera); 4102 denotes a DVD-RAM drive device for use as a removable media drive unit; 4103 indicates a computer; 401 is a control device with a CPU, a memory and an input/output circuit; 402, data input device such as a keyboard, mouse or the like; 403, a memory for storing therein image information as necessary for reproduction or reproduction of images; 404, a monitor permitting visual displaying of a display screen due to an operation of a chosen OS along with images and error messages. Numeral 405 designates image conversion means for converting an image signal as input from the TV camera 4101 into a signal of an appropriate form handleable by the control device 401, the image converter means including but not limited to a video image capture card; 406 denotes a connection interface of signals between the computer 4103 and DVD-RAM drive device 4102, such as for example a small computer system interface (SCSI) host card; 408 is a memory device such as a hard disk drive device; and 407 indicates a bus for interconnection between the control device 401 and respective constituent elements of the computer 4103 (i.e. the input device 402, memory 403, monitor 404, video capture card 405, SCSI host card 406, and hard disk drive device 408).

Note that the computer 4103 is generally constituted from the control device 401, input device 402, memory 403, monitor 404, video capture card 405, connection interface 406, bus 407, and hard disk drive device 408.

Also note that the TV camera 4101 and DVD-RAM drive device 4102 are connected to the computer 4103.

The computer 4103 is the one that performs control of recording and reproduction of image information incoming from the TV camera 4101 while simultaneously performing operation control of the DVD-RAM drive device 4102. The control device 401 of this computer 4103 is operable to provide access to respective components via the bus 407. In addition, those files for use in letting the OS or else and the computer 4103 operate are stored in the hard disk drive device 408 along with program files for performing the processing of the present invention.

In FIG. 4, an image information recording operation is under control of the control device 401. An image signal as generated at the TV camera 4101 is input to the video capture card 405 and is then converted under control of the control device 401 into a signal of the form handleable by the control device 401, which signal is indicative of the image information converted and is sent forth toward the SCSI host card 406.

The SCSI host card 406 passes the image information to the DVD-RAM drive device 4102, whereat the image information is recorded on its recording media.

The image information as read out of the DVD-RAM drive device 4102 to the computer 4103 is displayed on the monitor 404 via the SCSI host card 406.

Note here that although the embodiment as discussed herein is specifically arranged to employ the TV camera 4101 as an image information generator device, the image information generator device should not exclusively be limited thereto and may be any other image signal generators including but not limited to television tuners or video deck equipment.

Additionally, although the illustrative embodiment is designed to employ the DVD-RAM drive device 4102 as its image information recorder device, this may be any other similar suitable devices such as for example magneto-optical (MO) disk drive units. Further, the SCSI host card 406 is the connection interface between the DVD-RAM drive device 4102 and computer 4103, which is not limited to the specific arrangement shown herein and may be modifiable and alterable to other suitable ones in a way pursuant to the types of the computer and recorder used and also to signal send/receive schemes on a case-by-case basis. One example is that an integrated drive electronics (IDE) connection interface with extended protocols such as the advanced technology attachment packet interface (ATAPI) or else.

An explanation will next be given of the image recording/reproducing method embodying the invention for use with the image recording/reproducing apparatus shown in FIG. 4.

It should be noted that in the following explanation, the processes of flow charts shown in FIGS. 1-3, 5-7 and 9-10 are to be executed by the control device 401 in accordance with a program or programs as stored in the hard disk drive device 408.

Figure 1:
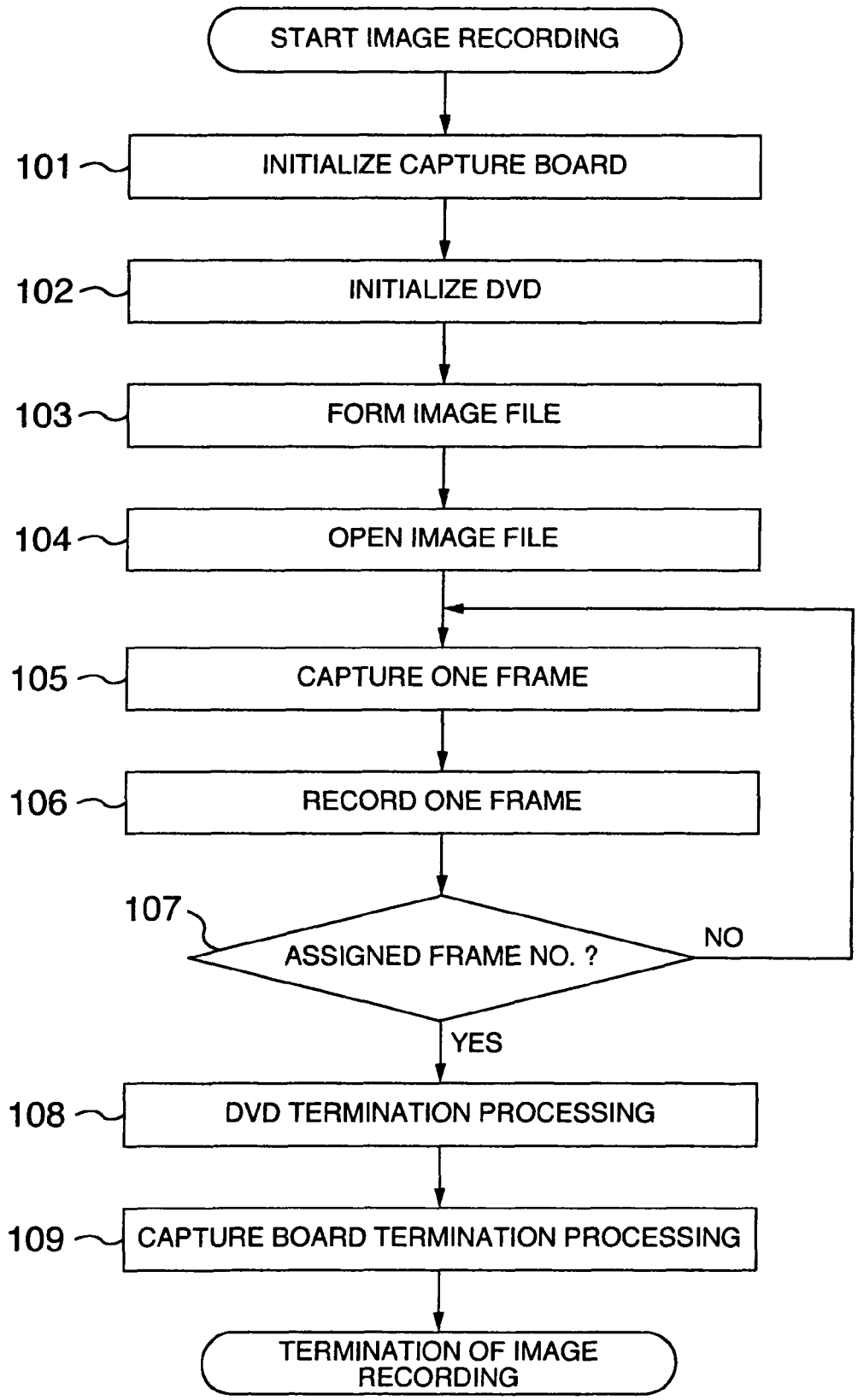
FIG. 1 is a flow chart showing the image information recording method according to an embodiment of the present invention.

Firstly, one embodiment of the image information recording method in the image recording/reproducing apparatus of the invention will be set forth in conjunction with FIG. 1.

FIG. 1 is a diagram showing a flow of program processing in the image recording/reproducing apparatus of the invention when recording image information.

In FIG. 1, upon startup of the image information recording processing, the system procedure begins with a capture card initialize process step 101 which performs initialization of the video capture card 405 and also settings of a frame rate and resolution of an image signal as input from the TV camera 4101. Then, the procedure proceeds to step 102 for DVD initialization.

At the DVD initialize step 102, perform initialization processing in such a way as to change or alter the settings of the DVD-RAM drive device 4102 to ensure that any error correction processing is rendered inactive by way of example to thereby improve a recording speed or rate when the DVD-RAM drive device 4102 writes data into a DVD-RAM and also a reproduction rate when the DVD-RAM drive device 4102 reads data out of the DVD-RAM. Then, the procedure goes to step 103. A program processing operation at step 102 will be discussed in detail with reference to FIG. 5 later in the description.

At step 103 for image file preparation, create an image file in a recording medium (in this embodiment, DVD-RAM) as preset in the DVD-RAM drive device 4102, which file is for use as a data storage region to be used during an image recording session. Then, the procedure goes to step 104. A program processing operation at step 103 will be later described in detail with reference to FIG. 6.

At image file open step 104, the image file as created at step 103 is subjected to preparation for being handled by specific file access functions unique to the instant invention rather than the standard file access functions of the OS used. The procedure then goes to step 105. A program processing operation at step 104 will be later set forth in detail with reference to FIG. 7.

At one-frame capture step 105 the video capture card 405 operates to perform capturing of an image from an image signal being input from the TV camera 4101. Then, the procedure proceeds to step 106.

At one-frame recording step 106, a command for recording information of one frame is issued to the DVD-RAM drive device 4102; then, the procedure goes to step 107.

At branch step 107 the image recorded is subject to count-up of its frame number to permit recurrent execution of the processes at steps 105 to 107 until the count value reaches a prespecified frame number. If the former reaches the latter then the procedure goes to step 108. The processing of from step 105 to step 107 is a main loop of the image recording operation.

At DVD termination processing step 108 the image recording processing is terminated causing the settings of the DVD-RAM drive device 4102 as modified at step 102 to return at its original state; then, the procedure goes to step 109.

At capture board termination step 109 a capture card operation termination processing is done as the image recording termination processing.

An explanation will next be given of an image information reproduction or playback method in the image recording/reproducing apparatus of the invention with reference to FIG. 2.

Figure 2:
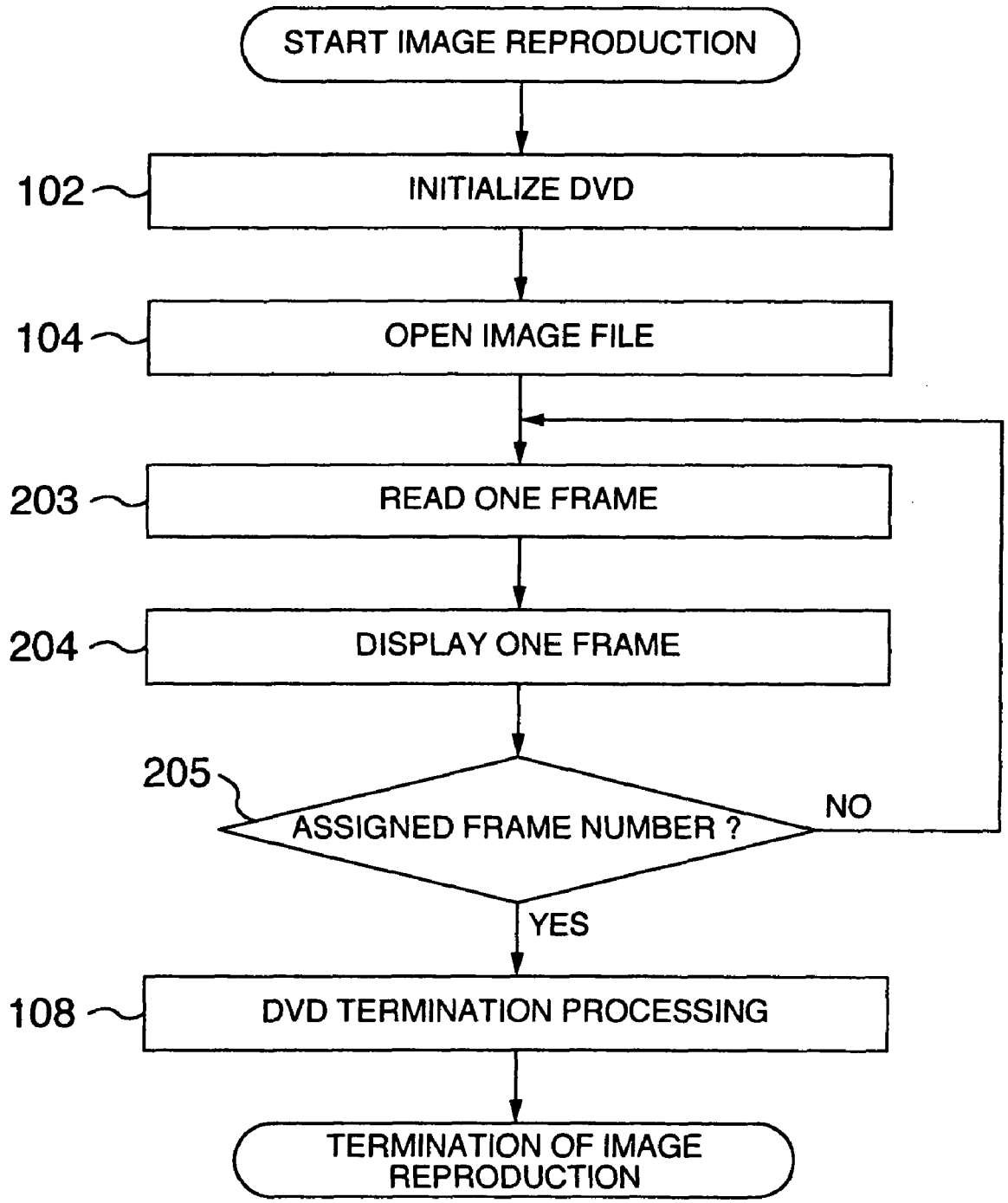
FIG. 2 is a flow chart showing the processing for visually displaying a noise image upon failure of reproduction of image information according to the embodiment of this invention.

FIG. 2 is a diagram showing a flow of embodiment processing for displaying an image upon occurrence of a failure containing noises in image information reading session in the case image information is reproduced by the image recording/reproducing apparatus of the invention.

In FIG. 2, upon startup of the image information reproduction processing, the system routine begins with DVD initialize step 102 which performs initialization processing of the DVD-RAM drive device 4102. Then, the routine proceeds to step 104.

At image file open step 104 an image file is subject to preparation for being handled by the file access functions unique to this invention rather than the OS-standard file access functions. After completion of such preparation the routine goes next to step 203 for one-frame reading.

At one-frame read step 203, issue a one-frame image information read command to the DVD-RAM drive device 4102; then the routine goes to step 204 for one-frame displaying.

At one-frame display step 204 the image information as read at step 203 is visually displayed on the screen of the monitor 404. Then, the routine proceeds to step 205.

At branch step 205 the image being displayed on the monitor 404 is subject to count-up of its frame number to thereby permit repeated execution of the processes at steps 203 to 205 until the count value reaches a prespecified frame number. If the former reaches the latter then the routine goes to step 108. The processing at steps 203 to 205 is a main loop of an image reproduction operation.

At DVD termination processing step 108 the image reproduction processing is terminated while causing the settings of the DVD-RAM drive device 4102 as altered at step 102 to return at its original state. As apparent from the foregoing, since the illustrative embodiment is specifically arranged to eliminate execution of a verify operation for checking whether the intended reproduction is in success or not, any images with read failures will also be displayed directly on the screen.

Another embodiment of the image information reproduction method for use in the image recording/reproducing apparatus of the invention will next be explained with reference to FIG. 3 below.

Figure 3:
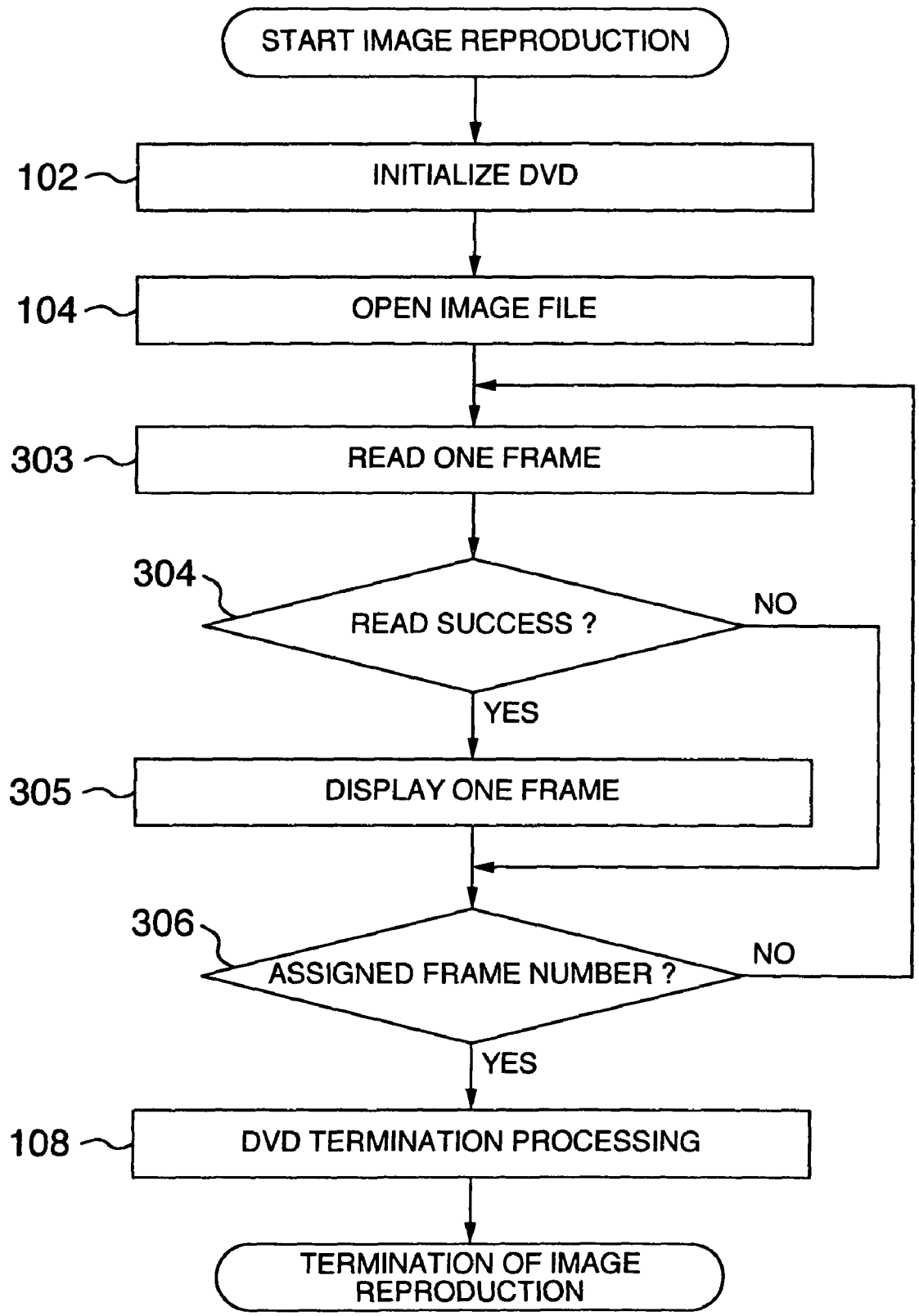
FIG. 3 is a flow chart showing the processing for displaying one preceding image upon failure of reproduction of image information according to the embodiment of the invention.

FIG. 3 is a diagram showing a flow of the embodiment's processing to be done when an attempt to reproduce image information is failed in the case the image recording/reproducing apparatus of the invention operates to reproduce image information, which processing is for displaying a certain image before the read-failure image.

As shown in FIG. 3, upon startup of the processing program for displaying one preceding image in a read failure event, the DVD-RAM drive device 4102 is initialized at step 102 shown herein. Then, the routine goes to step 104.

At image file open step 104 an image file is subject to preparation for being handled by the file access functions unique to this invention rather than the OS-standard file access functions. After completion of such preparation the routine proceeds to step 303 for one-frame reading.

At one-frame read step 203, issue a one-frame image information read command to the DVD-RAM drive device 4102; then the routine goes to step 304.

At branch step 304, an attempt is made to verify whether the read command issued at step 303 is in success or not: if YES, then the routine proceeds to step 305; if NO then go to step 306.

Note that if a read failure occurs at step 304, then the routine bypasses the next one-frame display step 305, which ensures that any read-failure image information is no longer displayed while letting its preceding image information (for example, the image information immediately before the read-failure image information) continue to be displayed with no changes applied thereto.

At one-frame display step 305 the image information as read at step 304 is visually displayed on the screen of monitor 404.

At branch step 306 the image being displayed on the monitor 404 is subject to count-up of its frame number to thereby permit repeated execution of the processes at steps 303 to 306 until the count value reaches a preselected frame number. If the former reaches the latter, then the routine goes to step 108. The processing at steps 303 to 306 is a main loop of this image information reproduction processing.

At DVD termination process step 108 the image reproduction processing is terminated while causing the settings of the DVD-RAM drive device 4102 as changed at step 102 to return at its original state.

It should be noted that the reproduction processing methods of FIGS. 2 and 3 are such that either one of them is preset by the image recording/reproducing apparatus; alternatively, both of them are interchangeably provided for selective use through the operator's command input activities via the input device 402 during the reproduction procedure.

A respective one of the procedures shown in FIGS. 1-3 will now be explained in greater detail with reference to FIGS. 5 through 13 below.

A detailed explanation will first be given of the initialization processing of the DVD-RAM drive device 4102 at the step 102 stated supra.

Figure 5:
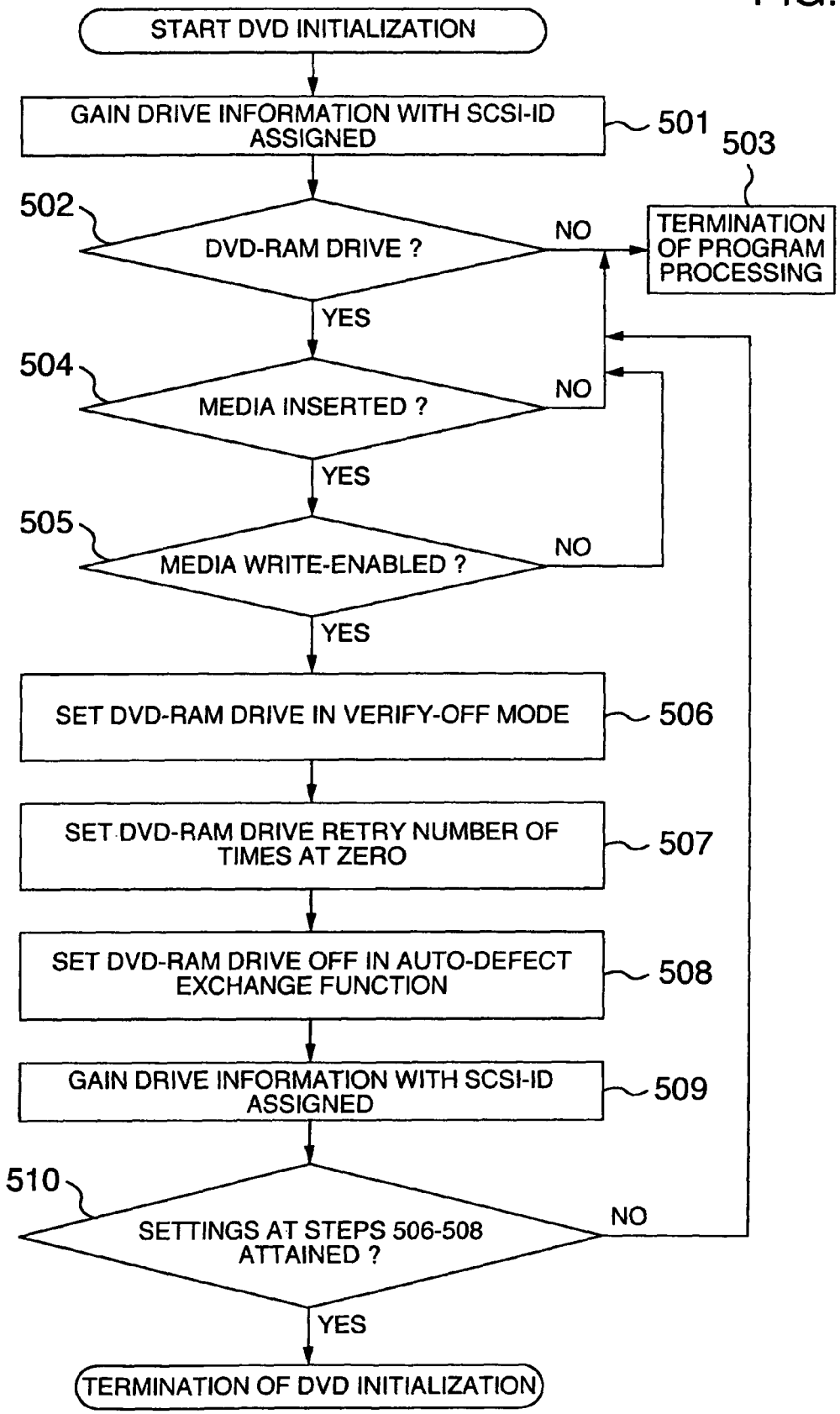
FIG. 5 is a flow chart showing details of DVD-RAM initialize processing according to the embodiment of the invention.

See FIG. 5, which is a diagram for explanation in detail of a flow of initialize processing of the DVD-RAM drive device 4102.

Here, change or modify the settings of the DVD-RAM drive device 4102 to thereby improve the recording rate when the DVD-RAM drive device 4102 writes data into a DVD-RAM and also the reproduction rate when the DVD-RAM drive device 4102 reads data out of the DVD-RAM.

With this embodiment the control of the SCSI DVD-RAM drive permits the computer 4103 to recognize the DVD-RAM drive device 4102 based on the SCSI identifier (ID) thereof.

In FIG. 5, upon startup of a program for initialization of the DVD-RAM drive device 4102, acquire device information of SCSI device equipment with the SCSI ID at device information acquisition step 501; then, the routine proceeds to step 502.

At step 502, the device information gained at step 501 is used to determine whether such SCSI device is the DVD-RAM drive device 4102. If YES, then the routine goes to step 504; if NO, then go to step 503.

At step 503 an error message is displayed on the screen of the monitor 404; then, terminate (interrupt) the initialize processing program.

At step 504, the information gained at step 501 is used to determine whether a recording medium (e.g. DVD-RAM) is inserted or loaded into the DVD-RAM drive device 4102. If YES, then the routine proceeds to step 505; if NO, then go to step 503 which terminates the initialize program.

At step 505, an attempt is made to identify whether the recording medium being presently loaded is a data-writable one. If NO, such as in the case of read-only media including a DVD read-only memory (DVD-ROM) or compact disc ROM (CD-ROM) or alternatively in the case of write-protected media, then the routine goes to step 503 which terminates the initialize program. If YES, i.e. the loaded media is in write-enable state, then go to step 506. The processing at this step 505 is inevitable for write processing; this is unnecessary and may be skipped during reproduction.

At verify mode setup step 506, a specific one of those setting items of the DVD-RAM drive device 4102 which indicates the verify mode is switched from an initial state (default state) to the "turn-off" (OFF) state (that is, invalid state); then the routine proceeds to step 507.

If this verify mode is in "turn-on" (ON) state (that is, valid state), after completion of recording processing, the read processing of the recorded information is executed for the purpose of verifying whether the intended recording processing has been done successfully.

On the contrary, when the verify mode item is turned off, after completion of write processing, the read processing of the recorded information is not executed. Turning off the verify mode may half shorten a time taken to complete the intended recording operation as compared to the verify mode turn-on event because of the absence of a time period for read processing in the verify-off event, since the time required for the write processing is almost same as that required for the read processing. With the illustrative embodiment, the verify mode is turned off since top priority is given to the recording speed.

At retry number zero setup step 507, the requisite number of retrying tasks of the DVD-RAM drive device 4102 is set at zero; then the routine goes to step 508.

The setting of the retry number at zero is done to avoid any unwanted decrease in recording speed otherwise occurring due to execution of retry (re-read) tasks when image information read processing is failed.

At automatic defect exchange function turn-off setup step 508, modify the settings of the DVD-RAM drive device 4102 so as to set the DVD-RAM drive device 4102's auto-defect exchange function item to an off state (that is, invalid state) from an initial state (default state); then, the routine goes to step 509.

The auto-defect exchange function as used herein is to be understood to mean a function of the DVD-RAM drive which is for eliminating the use of a certain region on the media into which data has been failed to be written while changing or "updating" the management information of such media to permit alternative use of a preliminary or "spare" region therefor.

However, such modification of the media's management information leads to creation of a wait time of about four (4) seconds in maximum, which can result in a likewise decrease in recording speed—to avoid this problem, the auto-defect exchange function is specifically set in the OFF state.

Even when the verify mode is OFF'ed, it will possibly happen that no writable regions are found on the media of interest due to the presence of surface contamination on a disk surface of such media; if this is the case, the intended recording operation is to be failed making the auto-defect exchange function active. This risk is avoidable by turn-off setup of the auto-defect exchange function stated above.

Owing to the processes at steps 506 to 508, the error correction processing is made inactive during recording.

At device information acquisition step 509, similar processing to that at step 501 is done in order to determine at its proceeding step 510 whether alteration of settings at steps 506-508 are effective, resulting in acquisition of device information of SCSI device equipment with the SCSI ID. The routine then goes to step 510.

At step 510, the device information of DVD-RAM drive device 4102 gained at step 509 is used to affirm whether the setup results as altered at steps 506-508 are kept effective. If correct alteration or update is not available, then proceed to step 503 which terminates (interrupts) the initialize processing program. Alternatively, if the settings are effective, then interpret that the intended DVD-RAM initialization is completed successfully, causing the DVD-RAM initialization to be terminated.

Figure 11:
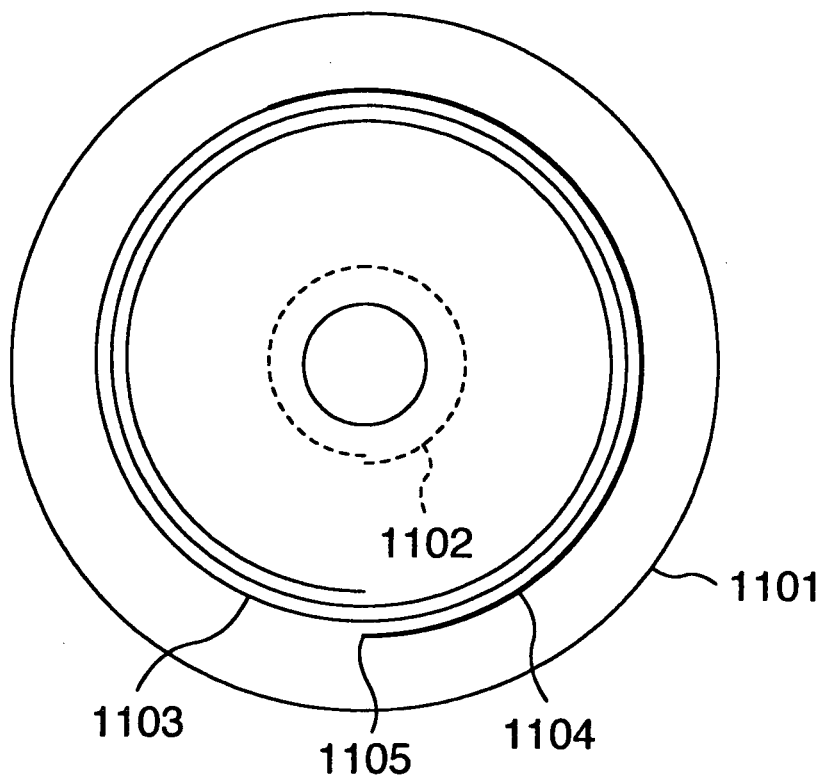
FIG. 11 is a diagram for brief explanation of a method for recording image information on a recording medium in a DVD-RAM drive according to the embodiment of the invention.

An explanation will next be given of image file preparation processing at step 103 with reference to FIG. 11 and FIG. 6.

Figure 6:
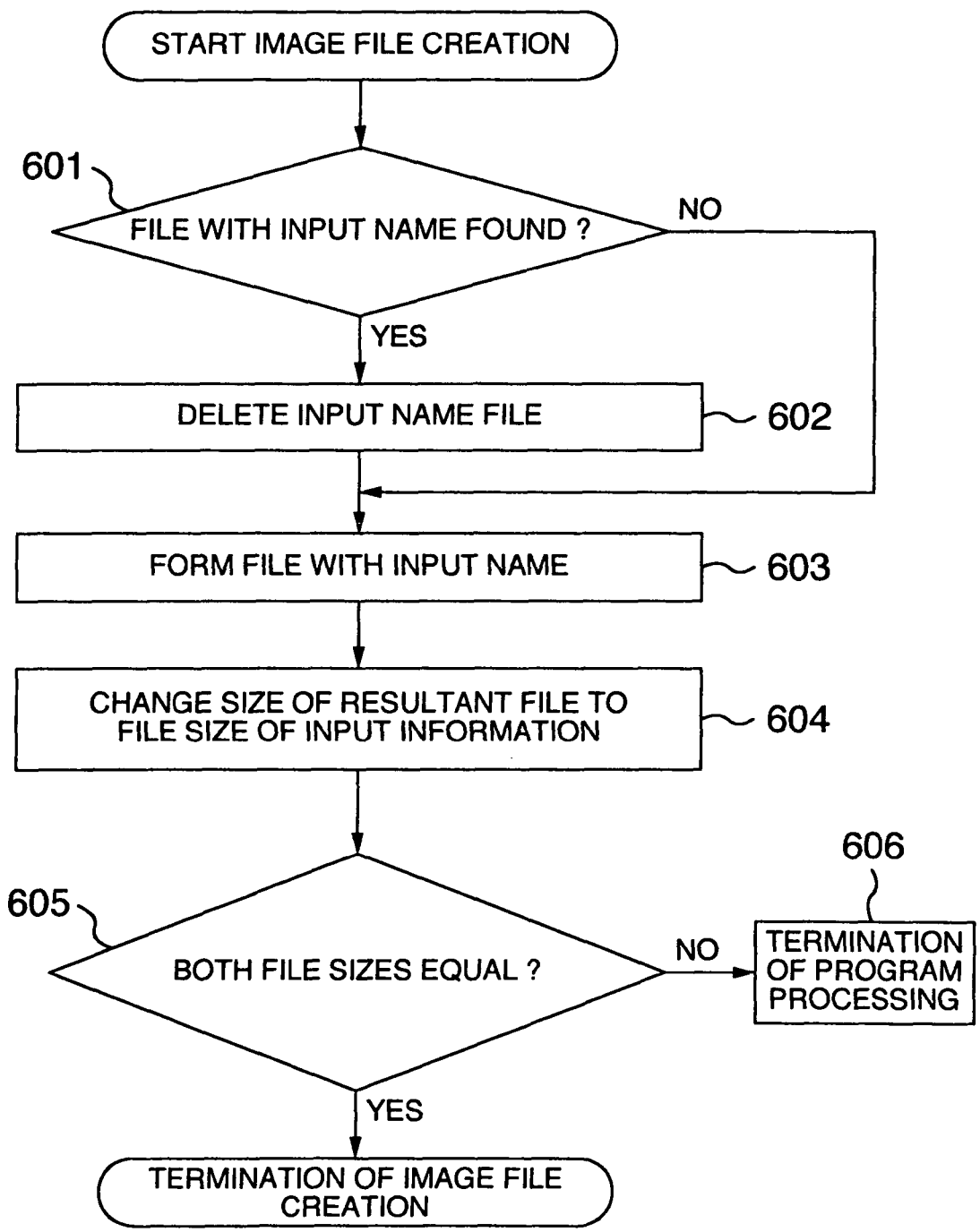
FIG. 6 is a flow chart showing details of image file preparation processing according to the embodiment of the invention.

FIG. 6 is a flow chart for explanation in detail of the image file preparation processing at step 103. FIG. 11 is a diagram for brief explanation of a method for recording image information on a recording medium (e.g. DVD-RAM) in the DVD-RAM drive device 4102, especially for explanation of the reason why the processing of FIG. 6 is to be done.

A numeral 1101 designates a DVD-RAM. A numeral 1102 denotes a part of a recording region on the DVD-RAM 1101, which is a file management information region (shown by thick line) storing therein table-of-contents information items as to those files on the media of interest for indicating a file size, preparation date, which file makes use of an area scanning from which position up to which position on the disk of the DVD-RAM 1101, and others. A numeral 1104 is a part of the recording region on the DVD-RAM 1101, namely, a region of those regions with image information recorded or written thereinto, which region stores therein the most recently recorded image information (shown by thick line). A numeral 1103 is a part of the record region on the DVD-RAM 1101, i.e., the remaining ones (shown by thin line) of the regions with image information recorded or written thereinto, excluding the region 1104.

According to a known methodology for using OS-standard file access functions to add image information to each file at its "tail" portion, a file size is changed whenever image information is recorded, which in turn requires "rewriting" (i.e. altering the file management information) of the exact position of the most recently written (that is, additional image information written) region 1104 on the DVD-RAM 1101 into the file management information region 1102. This would result in generation of seek processing between the position of the region 1104 and the position of region 1102. Due to the processing time required for the seek processing, the recording speed decreases. Note here that the seek processing as used herein may refer to a process for moving a read/write head of the DVD-RAM drive device 4102 from a certain position to another within the recording region on the DVD-RAM 1101. That is, upon each recording of the image information, the head of the DVD-RAM drive device 4102 in shifted from the last position 1105 of the region 1104 on the DVD-RAM 1101 to the position of the region 1102.

Typically, the read/write operation of the drive device for a removable record media such as a DVD-RAM gets started when the head moves to a target or "destination" region (file) and further arrives at the target sector of such a file.

According to the above-noted read/write scheme for use in those drive units having removable record media such as DVD-RAM drives or other similar ones, the presence of an appreciable head moving time required results in an increase in time taken for completion of the intended seek processing, which in turn reduces the recording speed accordingly upon occurrence of an increased number of seek processing events.

In view of the above, the present invention as disclosed herein is such that as exemplarily shown in the flow chart of FIG. 6, an image-record region is secured or "reserved" in advance on the recording medium through pre-creation of an image information recording file while limiting execution of alteration of the file management information so that it is done only in the initially occurred event with the file size alteration being inhibited in any events during image recording procedure. With such an arrangement, it becomes possible to lessen the requisite number of seek processing tasks otherwise resulting in a decrease in recording speed.

In FIG. 6, file preparation processing is done using standard file access functions inherently built in the OS per se.

When receiving a file name and file size as input information necessary for execution of the intended processing, create a file with such file name and file size.

Upon startup of a program for file preparation processing, at file name verify step 601, confirm whether or not a file with the input file name is present. If YES, then proceed to step 602; if NO, then go to step 603.

At file deletion step 602, delete the file with the input file name and then go to step 603.

At file creation step 603, create a file with the input file name and then go to step 604.

At file size change step 604, change or modify the created file so that it has a size equal to the file size of the input information, and then go to step 605.

At branch step 605 a file with the resultant file name is prepared and then confirm whether its file size is identical to the file size of input information. If NO, then proceed to step 606 which terminates the image file preparation processing program while visually displaying an error message on the screen of the monitor 404.

If YES at step 605, then the image file preparation processing must be in success, thus terminating the image file preparation program in this case also.

An explanation will next be given of the image file open procedure at step 104 with reference to FIG. 7 along with FIGS. 8 and 11-13.

Figure 7:
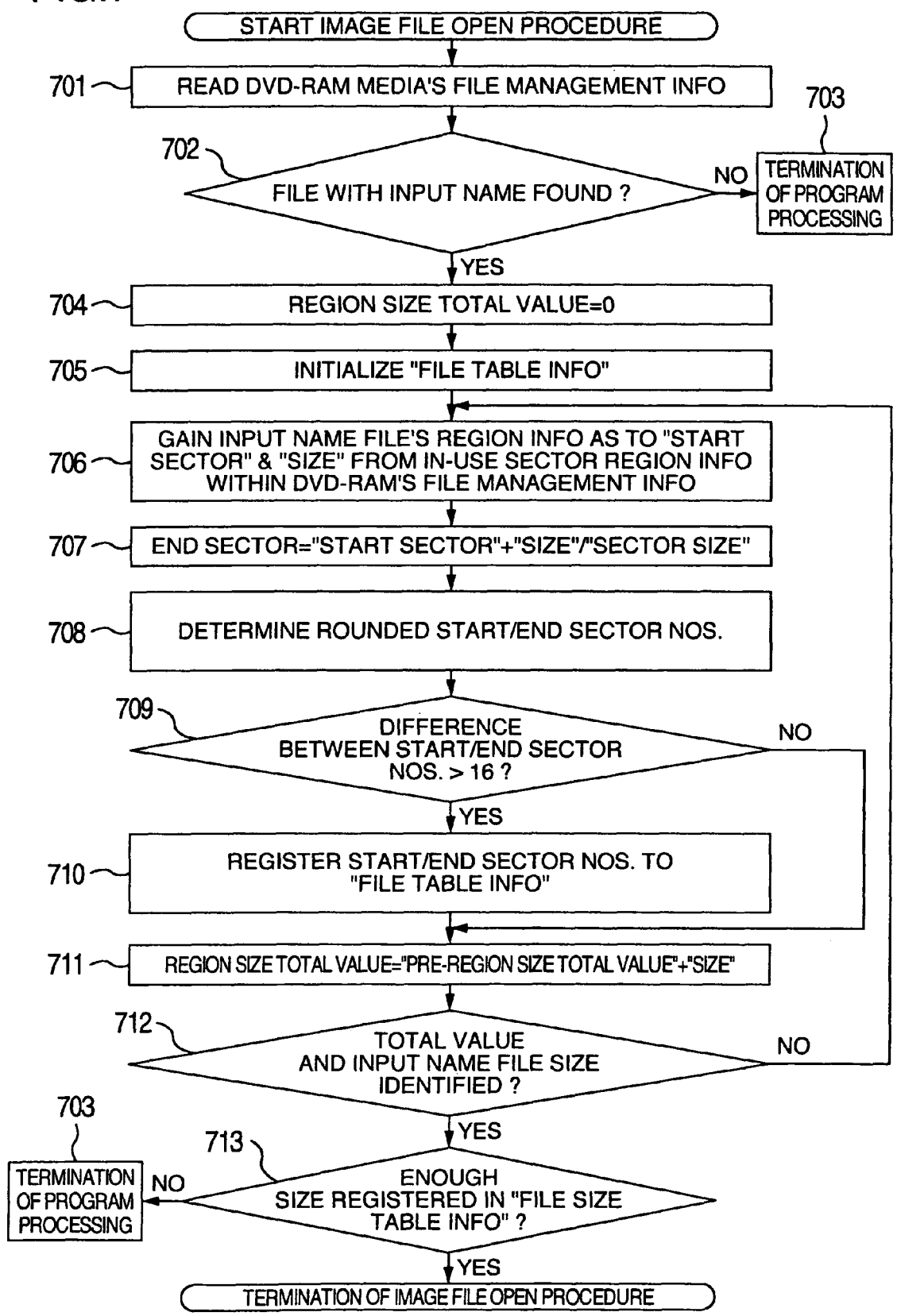
FIG. 7 is a flow chart showing details of image file open processing according to the embodiment of the invention.

FIG. 7 is a diagram for explanation of an embodiment of a detailed flow of the image file open procedure at step 104. For explanation of this processing, FIGS. 8 and 11-13 will be used.

As has been explained previously in conjunction with FIG. 11, the DVD-RAM 1101 has thereon the region 1102 which records file management information that involves file preparation date and an exact size of each file spanning from a sector to another (region information) and others. The file management information is such that as far as its specification is understood correctly, it is possible to obtain the information of any specific file (i.e. this file begins from which position and uses up to which position on the media) without having to use the OS-standard file access functions.

Additionally in the storage region on the DVD-RAM 1101, a single file will not always be recorded continuously, a single file recorded might often be subdivided into several portions or "segments." One example of this will be explained with reference to FIG. 12.

Figure 12:
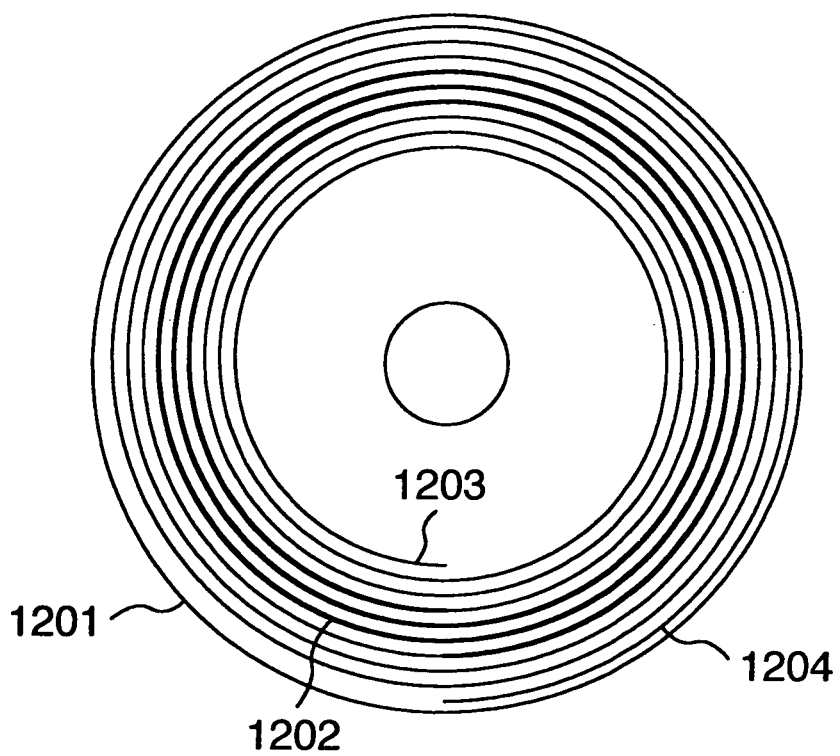
FIG. 12 is a diagram showing that a single file is fragmentally recorded into several subdivided portions in the DVD-RAM drive.

FIG. 12 is a diagram for explanation of a file as recorded fragmentally into an ensemble of spaced-apart file segments.

Numeral 1201 denotes a DVD-RAM; 1202 shows a region with more than one file has been recorded therein; 1203 and 1204 are two separate regions in which a single file is recorded so that it is divided into two file segments.

In FIG. 12, there is another recorded file (thick line). When an attempt is made to create a file in a later event, a file region is reserved in a way such that it is divided into two spaced-apart regions which are the region 1203 and region 1204 shown by thin lines. In this way, it often happens that a single logical file is disposed on recording media so that it is physically subdivided into a plurality of segments at several spaced-part locations.

Also note that the DVD-RAM drive has its feature that the recording speed is maximized when recording data from a specific sector number of a multiple of sixteen (16) to have a length of a multiple of 16 of the sector size.

This will be explained with reference to FIG. 13 below.

Figure 13:
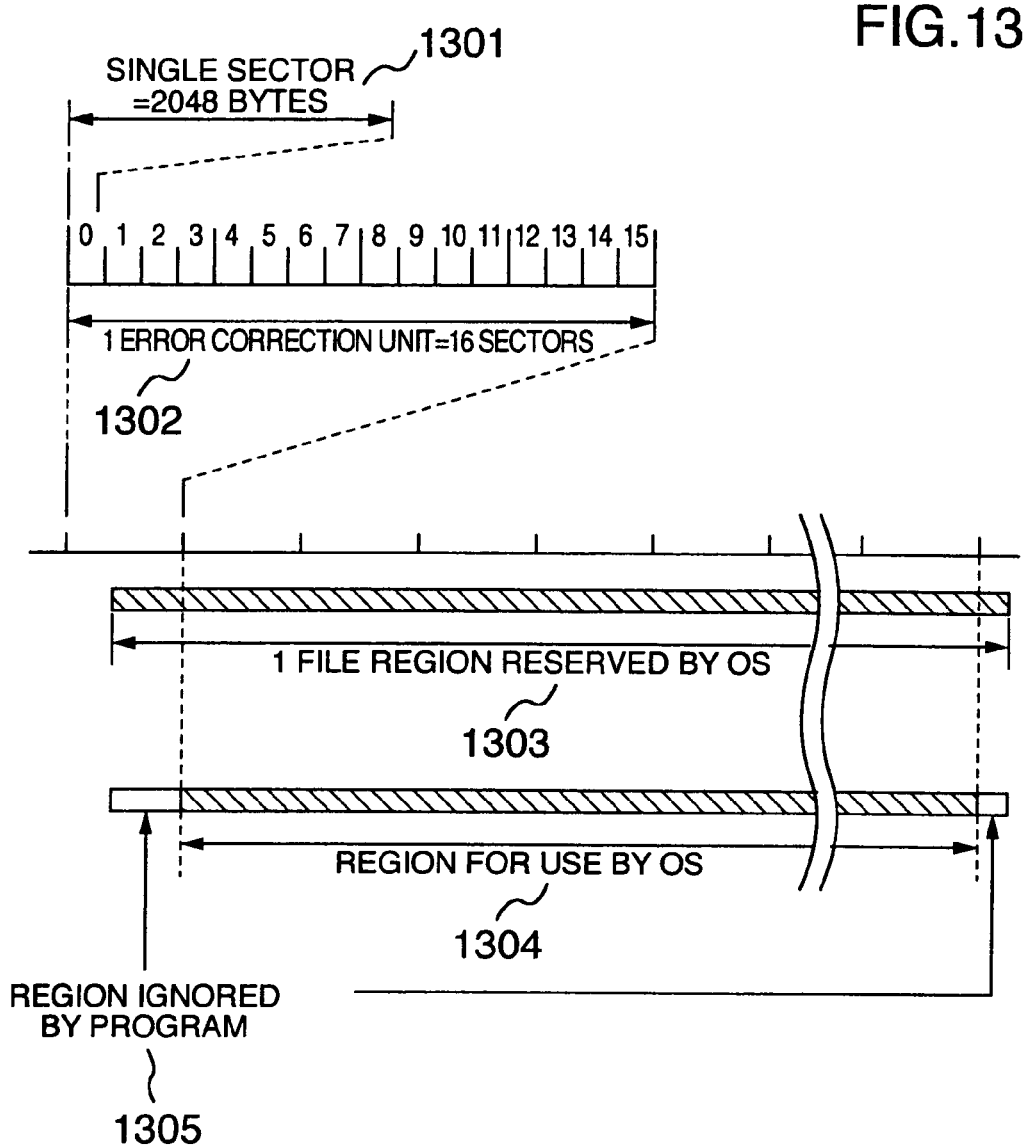
FIG. 13 is a diagram showing a sector and an error correction unit plus a file region.

FIG. 13 is a diagram for explanation of a sector and an error correction unit plus a file region.

1301 designates a single sector; 1302 denotes an error correction unit; 1303 shows one file region as reserved by the OS; 1304 indicates a region as used by the recording/reproducing method of the present invention; and 1305 is a region as ignored by the recording/reproducing method of the invention.

In FIG. 13 the DVD-RAM drive device 4102 is designed so that position management is done based on the sector 1301 being as a unit, wherein the sector is of 2,048 bytes.

In addition, error correction codes of the DVD-RAM drive device 4102 are designed so that these are added in the form of the error correction unit 1302 which consists of a set of sixteen (16) sectors as handled by error correction codes. And a single set or "cluster" is defined for every combination of sixteen sectors beginning from the 0-th sector at the top of a recording region of the DVD-RAM 1201.

One typical prior art recording method is such that when the length of information being recorded (same in the case of alternating the written information) is less than a multiple of sixteen sectors, the original or "source" information including this information formed on sixteen sector unit basis is temporarily read out of the DVD-RAM 1201 into a memory operatively associated with the DVD-RAM drive device 4102 and then subject to alteration with an error correction code(s) added thereto to thereby effectuate sixteen-sector data recording to the DVD-RAM 1201. In this respect, even when the information amount is less than sixteen sectors as the error correction unit 1302, the time for reading data of sixteen sectors as the data correction unit 1302 is necessarily required as the processing time. Thus, a recording speed will be decreased when compared to the recording scheme with the length of a multiple of sixteen-sector size.

In addition, even where recording is done with the length of the multiple of sixteen-sector size, if the sector number at start position is not a multiple of sixteen, then the resultant recording speed decreases because of the fact that two separate recording operations of the above-noted less-than-sixteen-sector length must be performed before and after passage of a specific sector number of the multiple of sixteen.

Due to this, the DVD-RAM drive is maximized in recording speed when recording data from a sector number of a multiple of sixteen with a length corresponding in value to a multiple of sixteen of the sector size.

In view of the foregoing, the recording/reproducing method of this invention is specifically arranged so that it does not use any portion which is involved within the region that has already been reserved as a file and which is hardly handleable with a "cluster" of sixteen sectors being as a unit. More specifically, as the file region 1303 shown in FIG. 13 is the one that has been reserved by use of the OS's file access functions, no specific consideration is taken to verify whether sixteen-sector unit-based handleability is available or not. On the contrary the file region 1304 which has been reserved by using the file access functions of the present invention is such that it uses only those portions that are capable of being handled in units of sixteen-sector clusters. At this time the region 1305 does not use any region that is not handleable in units of sixteen-sector clusters even where this has been reserved as a file.

So far, it has been explained that when a plurality of regions are present within the file of interest, the image recording/reproducing method of the invention is arranged to use only those regions handleable in units of sixteen-sector clusters within such file.

For the purpose of indicating positions within a file by a processing program, the invention employs within-the-file addresses with only those sector portions handleable in units of sixteen-sector clusters being logically continued.

The top address of the leading 0-th sector is "0," and the top address of first sector is "2048," wherein address assignment is in units of bytes.

For conversion between the within-the-file addresses and the sector numbers handleable in units of sixteen-sector clusters, the invention provides file table information. The file table information will be explained with reference to FIG. 8 below.

Figure 8:
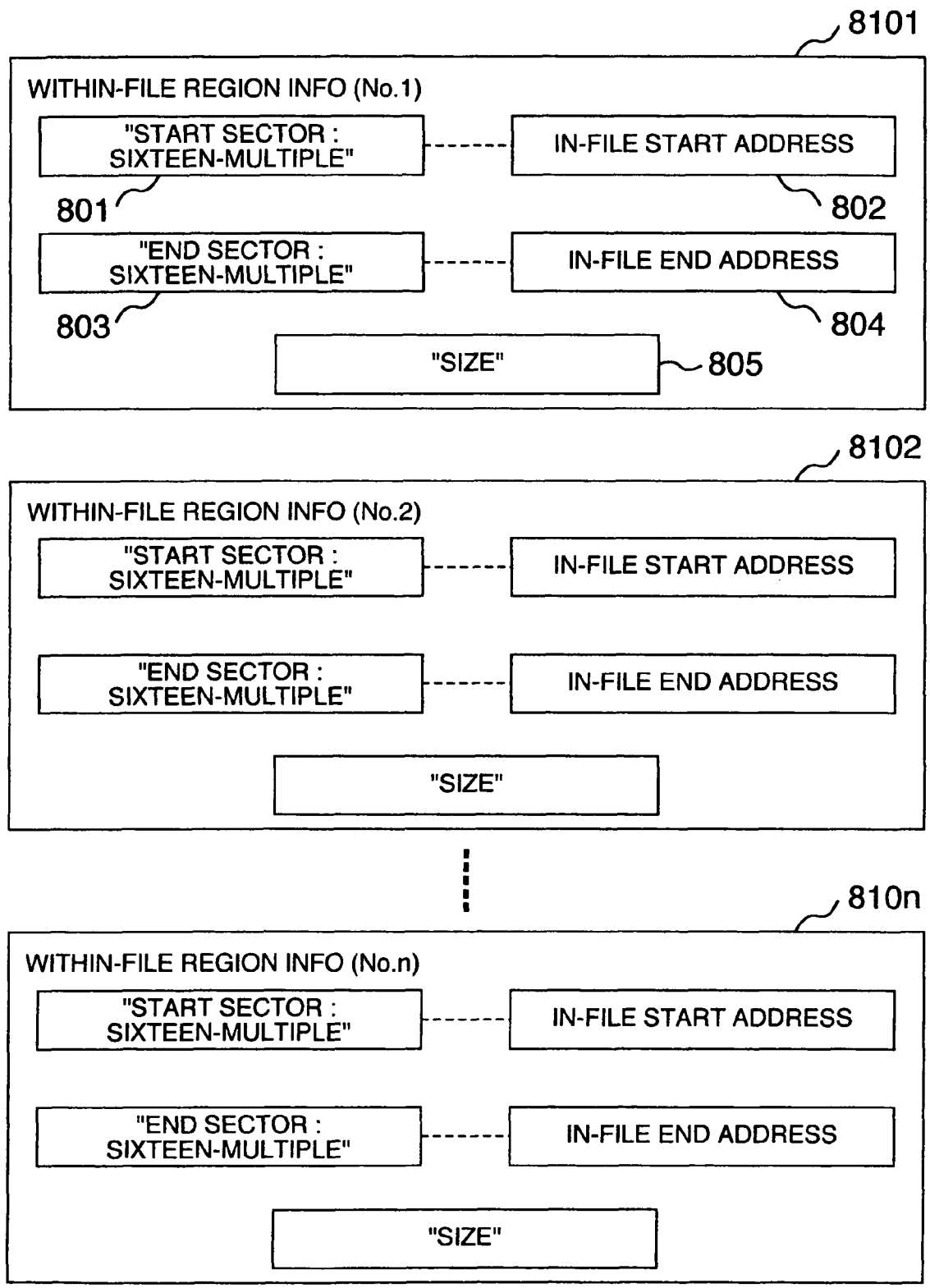
FIG. 8 is a diagram showing a file table according to the embodiment of the invention.

FIG. 8 is a diagram for explanation of the file table information of the invention.

The file table information is arranged to include constituent elements 8101, 8102, . . . , 810n (where "n" is an integer), each of which is a region handleable in units of sixteen-sector clusters.

One of the respective constituent elements, e.g. a constituent element 8101, is the first of the within-the-file region information which contains "start sector-sixteen-multiple information" shown by a variable 801 with the top or "head" sector number of a region handleable in units of sixteen-sector clusters and "end sector-sixteen-multiple information" shown by variable 803 with the "tail" sector number of the region handleable in units of sixteen-sector clusters along with their corresponding "within-the-file start address" and "within-the-file end address," wherein the former is shown by variable 802 of the within-the-file address whereas the latter is by variable 804.

Additionally the constituent element 8101 also contains therein "size" information shown by variable 805, which is indicative of the region's byte size on the DVD-RAM. Similarly the constituent element 8102 is the second of the within-the-file region information; the constituent element 810n is the n-th of the within-the-file region information.

FIG. 7 is a flow chart showing the processing program at the image file open step 104.

In FIG. 7, processing is done for registration of a sector region of multiple regions within a file as "file table information," which region is handleable in units of sixteen-multiples. Input information for this processing includes file name information, wherein processing for opening a file with this file name is performed as will be set forth below.

Upon startup of the image file open processing program, the system routine begins with management information read step 701 which uses a reproduction command of SCSI command to read file management information as recorded on the DVD-RAM 1201. The routine then proceeds to step 702.

At step 702, search is made to determine whether a file with the file name of the input information is present in the file management information: if YES then the routine proceeds to step 704; if NO then go to step 703. At step 703 the image file open processing is terminated (interrupted) while visually displaying an error message on the screen of the monitor 404.

At step 704 for setting the region size at zero, let the variable of the "region size total value" for use as a counter be set at "0"; then the routine proceeds to step 705 for file table information initialization. At this step 705, initialize the "file table information."

At region information acquisition step 706, acquire from one of a plurality of existing region information items within the file both "start sector" information of the top information of the region and "size" information of byte size information of such region. In other words, gain the region information of the "start sector" and "size" of an input file name from in-use sector region information as involved within the of DVD-RAM media's file management information. Then, the routine goes to step 707 for calculation of an end-point sector.

At end sector calculation step 707, calculate from the "start sector" information and "size" information the "end sector" information indicating that the region of interest extends up to which sector in a way such that "end sector"="start sector"+"size"/"sector size" for example. The routine then goes to step 708.

At round-up/round-down step 708, in order to obtain the start point and end point of a sector which is within the region and is equal in value to a multiple of sixteen, perform round-up calculation using a multiple of sixteen of "start sector: sixteen-multiple"="start sector" while performing round-down calculation using the multiple of sixteen of "end sector: sixteen-multiple"="end sector"; then, the routine goes to step 709.

At sector number judgment step 709, perform calculation of "end sector:sixteen-multiple"–"start sector:sixteen-multiple" to thereby calculate a within-the-region sector number handleable in units of sixteen-sector clusters. If such sector handleable in units of sixteen-sector clusters is absent within the region then the routine proceeds to step 711 (while eliminating registration to "file table information"); if such sector is present then go to step 710.

At file information registration step 710, register the information of "start sector:sixteen-multiple" of this variable 810 and "end sector:sixteen-multiple" of variable 803 to the file table information" of the structural body 8101 by way of example while calculating the variable 802 "within-the-file start address" and variable 804 "within-the-file end address" of a corresponding within-the-file address; thereafter, the routine goes to step 711.

At region size update step 711, let the resultant "size" information of variable 805 thus searched be added to the counter variable "region size total value"; then, go to step 712.

At file size determining step 712, if the "region size total value" is identical to the file size of the input information then determine that all the regions concerned have been checked; then go to step 713. If the former is less than the latter, then determine that more than one non-checked region information still remains; thus, return to step 706.

At step 713, an attempt is made to determine whether the region information as has been registered to the "file table information" has a sufficient size (e.g. more than ninety percent of the file size): if NO, then go to step 703 which terminates the processing while displaying an error message on the screen of the monitor 404; if YES, then determine that the intended image file open processing is completed successfully. In the way discussed above, writing and reading of image information are eliminated in the event that the size is less than the unitary data size being handled during error correction processing.

Generally, with recording/reproducing apparatus employing data storage units with removable media such as DVD-RAM drives or else, read/write head movement or seek rate stays lower causing the recording speed to decrease upon occurrence of an increased number of seek processing tasks. Accordingly, lessening the seek processing number leads to speed-up of the processing required.

Although the within-the-file addresses are assigned in an order of sequence of those regions as reserved by the OS during creation of the "file table information" within the file open processing of the illustrative embodiment, another method is also available for performing such within-the-file address number assignment processing after having sorted the regions in the order proportional to the significance of the sector numbers on the media to ensure that the head's travel distance becomes minimized during seeking.

Figure 9:
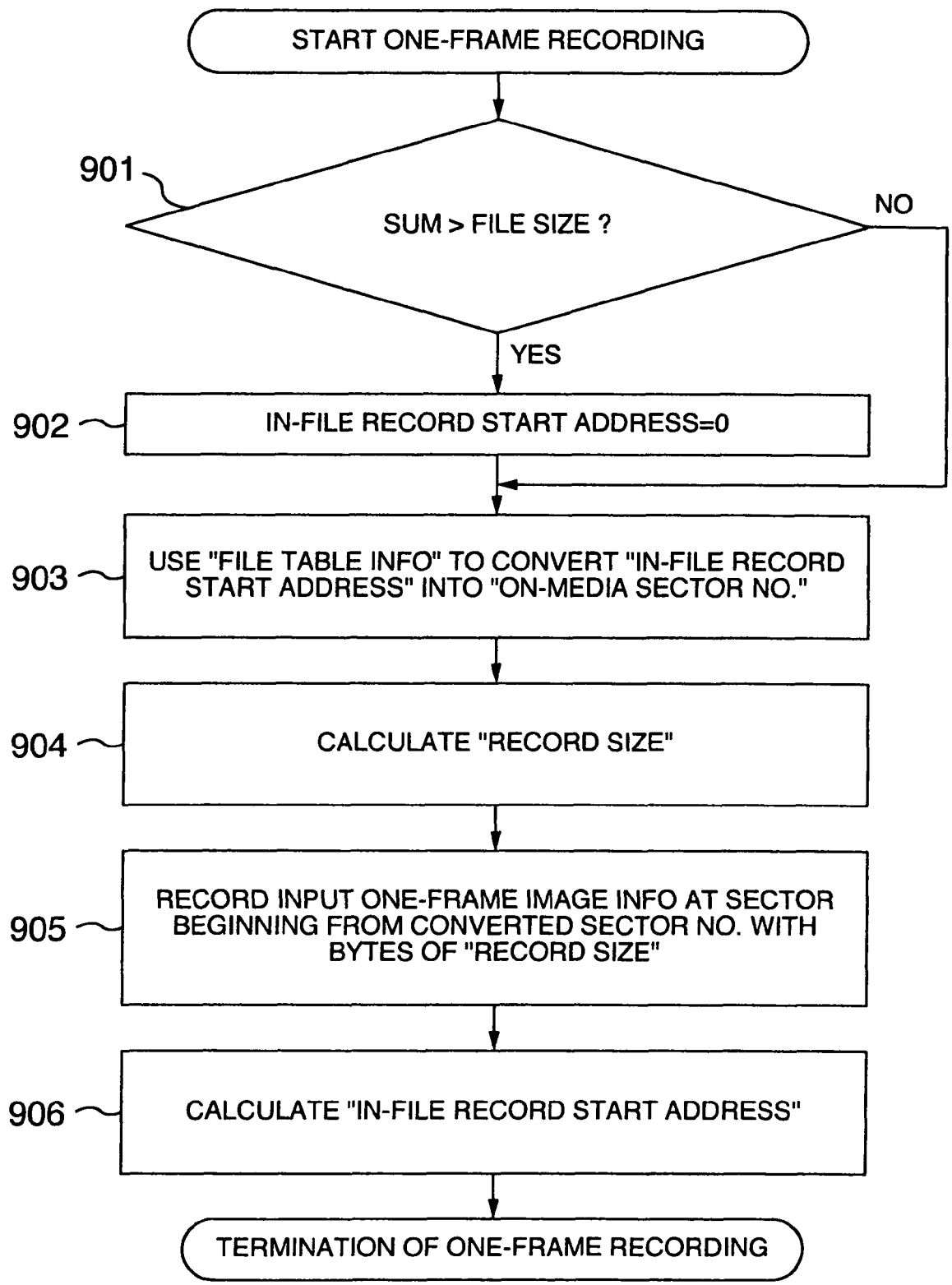
FIG. 9 is a flow chart showing one-frame image information write processing according to the embodiment of the invention.

FIG. 9 is a flow chart showing the recording processing program for writing image information of one frame at the step 106 stated supra. During this processing, one frame information and its byte size are present as input information. In addition, within this processing program, a "within-the-file record address" variable is also present as a value indicative of which address within a file is first subject to recording.

Although in this embodiment one specific example is shown in which this value is set at "0" upon startup of the processing program while causing the image information recording operation to begin from the top part of such file, another approach is also available which lets the initial value be set at any given value while permitting the recording to get started from a given address.

Figure 14:
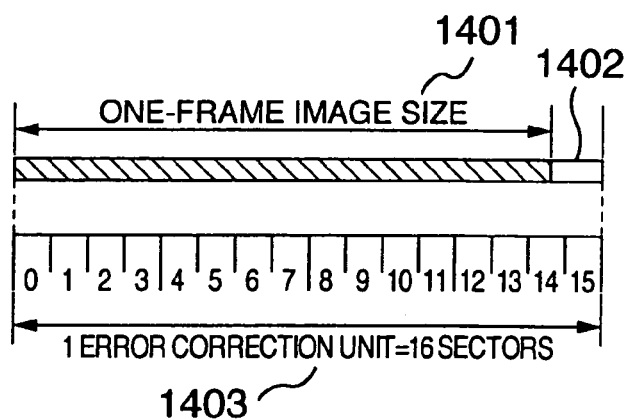
FIG. 14 is a diagram showing the size of a single frame of image information in accordance with the embodiment of the invention.

Additionally, the embodiment as discussed herein is arranged under an assumption that the size 1401 of one frame of the image information falls within the sixteen-sector size of one-error correction unit 1403 while letting the portion 1402 less than sixteen sectors be out of the use. Due to this, the top of each image frame becomes the top byte of the sixteen-sector unit, as shown in FIG. 14.

In FIG. 9, upon startup of a one-frame image information recording processing program, the system procedure begins with file size determining step 901 which checks to determine whether the total value of the "within-the-file record start address" and the size of image information of input information goes beyond the file size of the image file as created at step 103. If NO, then the procedure proceeds to step 903; if YES, then go to step 902.

At write start address setup step 902, let the "within-the-file record start address" be set at "0" and then record image information from its top part. The procedure then goes to step 903.

At write start address conversion step 903, use the "file table information" to convert the "within-the-file record start address" into "on-media sector number"; then, the procedure goes to step 904.

At record size calculation step 904, calculate the value of "record size" of a value as rounded up to a multiple of sixteen-sector size in order to make the byte size of image information of the input information identical to the sixteen-sector size. More specifically, let the "record size" be equal to a value as rounded up to a multiple of sixteen-sector size of the "one-frame information size" of the input information. Then, the procedure goes to step 905.

At input information recording step 905, perform recording of the "one-frame image information" of the input information at a sector that begins from "on-media sector number" and has its byte number equal to "record size"; then, go to step 906.

At record start address update step 906, updating is done while adding the value of "record size" to "previous within-the-file record start address. More specifically, let the "within-the file record start address" equal to "previous within-the-file record start address" plus "record size." Then, determine that one-frame recording processing is completed successfully.

Although this embodiment is under the assumption that the size of one image frame falls within the sixteen-sector size as shown in FIG. 14, in the case of causing a plurality of image frame information items to exist with the sixteen-sector size for saving the data storage amount or alternatively in the case of permitting the one-frame image size to be in excess of the sixteen-sector size, a certain mechanism may be provided for subdividing the image information into portions each having the sixteen-sector size within the program while allowing the DVD-RAM 1201 to perform a recording operation in units of sixteen-sector sizes, with an associative mechanism being separately provided for holding or retaining a within-the-file address at the top of each image frame.

Figure 10:
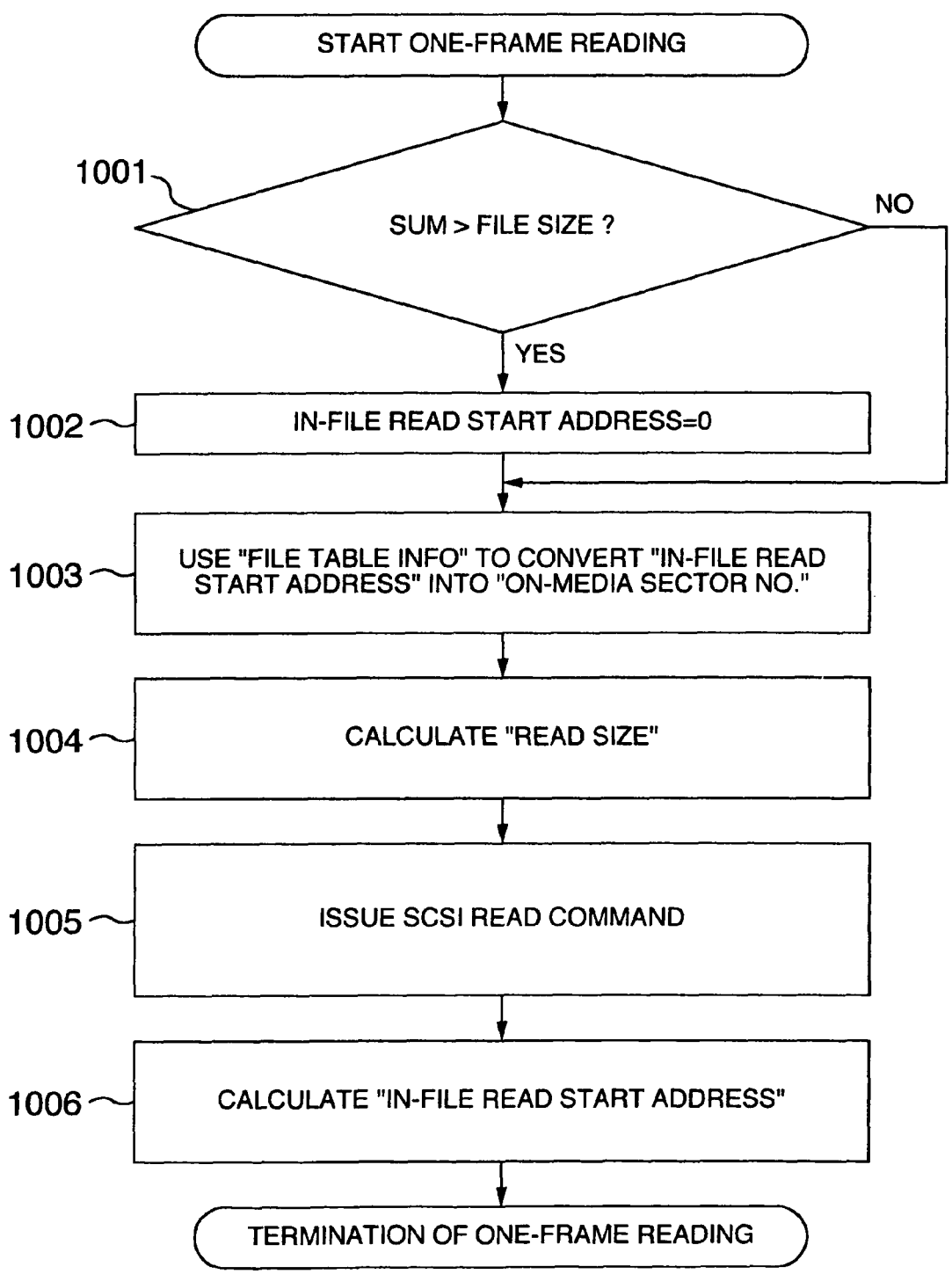
FIG. 10 is a flow chart showing one-frame image information read processing according to the embodiment of the invention.

FIG. 10 is a diagram for detailed explanation of a flow of one exemplary processing program for reading one-frame image information either at the step 203 of FIG. 2 or at step 303 of FIG. 3.

This exemplary one-frame read processing shown herein is for reading the image information as has been recorded through the procedure shown in FIG. 9.

During this processing, a reproduction destination for reproduction of one-frame information and its byte size are present as input information. Also available within the program is a "within-the-file read start address" variable with a specific value indicative of which address within the file should be first subjected to the intended image information read operation.

Although this embodiment is illustratively designed so that this variable's value is set at "0" upon startup of the program in a way similar to the write processing of FIG. 9 while causing the image information reproduction to get started from the top of such file, the image reproduction may alternatively be arranged to get started from any given address.

In FIG. 10, upon startup of the one-frame image information read processing program, an attempt is made at file size determine step 1001 to determine whether the total value of the "within-the-file read start address" and the size of image information of input information is in excess of the file size.

If NO at step 1001, the system routine proceeds to step 1003; if YES then go to step 1002.

At within-the-file read start address setup step 1002, let the "within-the-file read start address" be set at "0" to thereby perform reading of image information from its top part. Then, the routine proceeds to step 1003.

At read start address conversion step 1003, use the "file table information" to convert the "within-the-file read start address" to "on-media sector number"; thereafter, the routine goes to step 1004.

At read size calculation step 1004, calculate the value of "read size" with a value as rounded up to a multiple of sixteen-sector size in order to make the byte size of image information of the input information identical to the sixteen-sector size. More specifically, let the "read size" be equal to a value as rounded up to a multiple of sixteen-sector size of the "one-frame information size" of the input information. Then, the procedure goes to step 1005.

At input information read step 1005, perform reading of the byte number of "read size" from the sector of "on-media sector number" to the "one-frame image information's read destination" of the input information. More specifically, issue a SCSI command to read data with bytes equal to the "read size" out of a specific sector beginning from the "on-media sector number" into the "one-frame image information's read destination" of the input information. Thereafter, the procedure goes next to step 1006.

At read start address update step 1006, the read start address is updated with the value of "read size" added to the "previous within-the-file start address." Specifically, perform calculation letting the "within-the-file read start address" be equal to "previous within-the-file read address" plus "read size." Then, determine that the one-frame read processing required is completed successfully.

Although in the illustrative embodiment the method for controlling the SCSI-standardized DVD-RAM drive using SCSI commands, the DVD-RAM drive in this embodiment should not be limited thereto and may be replaced with any other similar suitable ones including, but not limited to, those DVD-RAMs with ATA or other connection schemes.

Further, although in the aforesaid embodiment, the explanation has been made as to the case where a DVD-RAM disk is used as a kind of removable disks as a recording medium, for example, a disk-shaped recording medium, the technique of the invention for recording and reproducing data at high speeds on and from a disk-shaped recording medium can be applied not only to removable disks but also to non-removable disks such as hard disks.

It has been stated that in accordance with the present invention, it is possible to provide the image recording/reproducing method and apparatus for use in image recording/reproducing apparatus employing a CPU such as a computer to record and reproduce image information, which are capable of recording and reproducing image information on and from recording media at increased speeds.

Furthermore, the use of such image recording/reproducing method and apparatus incorporating the principles of the invention enables facilitation of delivery and long-term storage of image information required.

What is claimed is:

1. An image recording method for recording image information on a recording medium, comprising the steps of:
   inputting the image information;
   initializing the recording medium;
   preparing an image file region on the recording medium by an operating system;
   recording the image information on the image file region on a single frame unit basis,
   wherein the step of initializing includes a step of executing at least one of a substep of setting not to verify whether or not a recording processing has been done successfully, a substep of setting not to retry the recording processing and a substep of setting to turn-off an automatic defect exchange function of the recording, and
   wherein the step of preparing an image file region includes a substep of detecting a file size of the image information from input information of the image information and a substep of at first changing once a size of the image file region of the recording medium based on the detected file size;
   reading, on a single frame unit basis, the image information recorded on the recording medium; and
   sequentially displaying on a monitor the image information read on the single frame unit basis,
   wherein when a failure has occurred in reading of one frame of the image information in the step of reading, the one frame is not read again, and the image information of a frame just before the one frame is continued to be displayed on the monitor without displaying the image information of the one frame;
   a recording region selecting substep of selecting only a recording region capable of being handled on a unit of adding error correction codes upon recording, among the image file region prepared on the recording medium in the step of preparing an image file region; and
   an image information recording substep of recording, on the recording region thus selected, the image information of one or plural frames at every recording region of one or a plurality of the units each being the unit of adding error correction codes,
   wherein the recording region selecting substep includes a substep of, as to each of physically continuous regions existing within the recording region thus selected, calculating a start sector by a round-up calculation using a multiple of the unit of adding error correction codes and calculating an end sector by a round-down calculation using a multiple of the unit of adding error correction codes.

2. An image recording apparatus for recording image information on a recording medium, comprising:
   an inputting unit which inputs the image information;
   an image recording control portion which has an initializing unit of initializing the recording medium and a preparing unit of preparing an image file region on the recording medium by an operating system;
   a recording unit which records the image information on the image file region on a single frame unit basis,
   wherein the initializing unit includes at least one of a function of setting not to verify whether or not a recording processing has been done successfully, a function of setting not to retry the recording processing and a function of setting to turn-off an automatic defect exchange function of the recording, and
   wherein the preparing unit includes a function of detecting a file size of the image information from input information of the image information and a function of at first changing once a size of the image file region of the recording medium based on the detected file size;
   an image information reproducing unit which includes a unit of reading, on a single frame unit basis, the image information recorded on the recording medium, and a unit of sequentially displaying on a monitor the image information read on the single frame unit basis, wherein even when a failure has occurred in reading of one frame of the image information in the step of reading, the one frame is not read again, and the image information of a frame just before the one frame is continued to be displayed on the monitor without displaying the image information of the one frame, and wherein the recording unit includes a recording region selecting unit of selecting only a recording region capable of being handled on a unit of adding error correction codes upon recording, among the image file region prepared on the recording medium by the preparing unit; and an image information recording unit of recording, on the recording region thus selected, the image information of one or plural frames at every recording region of one or a plurality of the units each being the unit of adding error correction codes, wherein the recording region selecting unit includes a unit of, as to each of physically continuous regions existing within the recording region thus selected, calculating a start sector by a round-up calculation using a multiple of the unit of adding error correction codes and calculating an end sector by a round-down calculation using a multiple of the unit of adding error correction codes.

* * * * *